United States Patent
Jung et al.

(10) Patent No.: US 8,442,832 B2
(45) Date of Patent: May 14, 2013

(54) APPARATUS FOR CONTEXT AWARENESS AND METHOD USING THE SAME

(75) Inventors: Younggiu Jung, Daejeon (KR); Munsung Han, Daejeon (KR); Dongwan Ryoo, Daejeon (KR); Changseok Bae, Daejeon (KR); Jintae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 736 days.

(21) Appl. No.: 12/632,010

(22) Filed: Dec. 7, 2009

(65) Prior Publication Data

US 2010/0145695 A1   Jun. 10, 2010

(30) Foreign Application Priority Data

Dec. 8, 2008  (KR) .................. 10-2008-0124131
Oct. 30, 2009  (KR) .................. 10-2009-0104128

(51) Int. Cl.
*G10L 21/00*   (2006.01)
(52) U.S. Cl.
USPC .................. 704/270; 704/272; 704/270.1
(58) Field of Classification Search ............ 704/1–10, 704/231, 233, 270, 275, 270.1, 235, 272; 706/14; 713/100; 348/211.1
See application file for complete search history.

(56) References Cited

U.S. PATENT DOCUMENTS

| | | | |
|---|---|---|---|
| 6,629,242 B2 * | 9/2003 | Kamiya et al. | 713/100 |
| 6,901,390 B2 * | 5/2005 | Mizokawa | 706/14 |
| 7,999,857 B2 * | 8/2011 | Bunn et al. | 348/211.1 |
| 2002/0028988 A1 | 3/2002 | Suzuki et al. | |
| 2003/0182123 A1 | 9/2003 | Mitsuyoshi | |
| 2005/0187437 A1 | 8/2005 | Matsugu et al. | |
| 2009/0265170 A1 | 10/2009 | Irie et al. | |

FOREIGN PATENT DOCUMENTS

| | | |
|---|---|---|
| JP | 2001-083984 A | 3/2001 |
| JP | 2001-327472 A | 11/2001 |
| JP | 2005-237561 A | 9/2005 |
| JP | 2006-004409 A | 1/2006 |
| JP | 2006-267464 A | 10/2006 |
| JP | 2007-065969 A | 3/2007 |
| KR | 1020020018541 A | 3/2002 |
| KR | 1020050025552 A | 3/2005 |
| KR | 1020060032392 A | 4/2006 |
| KR | 1020060105312 A | 10/2006 |
| WO | 2008/032787 A1 | 3/2008 |

OTHER PUBLICATIONS

Hirohide Ushida et al; "Artificial System having emotions", Japan Fuzzy Journal, Dec. 15, 2000, vol. 12, No. 6, pp. 44-51, Japan.

* cited by examiner

*Primary Examiner* — Huyen X. Vo (74) *Attorney, Agent, or Firm* — Ladas & Parry LLP (57) ABSTRACT

An apparatus for context awareness includes: a voice-based recognition unit that recognizes a user's emotional state on the basis of a voice signal; a motion-based recognition unit that recognizes the user's emotional state on the basis of a motion; a position recognition unit that recognizes a location where the user is positioned; and a mergence-recognition unit that recognizes a user's context by analyzing the recognition results of the voice-based recognition unit, the motion-based recognition unit, and the position recognition unit. Accordingly, it is possible to rapidly and accurately accidents or dangerous contexts caused to a user.

13 Claims, 4 Drawing Sheets

FIG. 4

APPARATUS FOR CONTEXT AWARENESS AND METHOD USING THE SAME

RELATED APPLICATIONS

The present application claims priority to Korean Patent Application Serial Number 10-2008-0124131, filed on Dec. 8, 2008 and Korean Patent Application Serial Number 10-2009-0104128, filed on Oct. 30, 2009, the entirety of which are hereby incorporated by reference.

BACKGROUND OF THE INVENTION

1. Field of the Invention

The present invention relates to a method for context awareness and a method using the same and, more particularly, to a context awareness technology, particularly, a technology that recognizes a user's emotional state by merging a measurement result of multiple sensors.

2. Description of the Related Art

A context awareness technology is a technology for providing useful information to human by being aware of and judging circumstantial context through the use of communication and computing abilities. Context information used for context awareness includes positions and activity states of people and objects, etc. as all information which can be used at the time when a user performs interaction. The context awareness technology can be aware of the circumstantial context through collection and exchange of the context information and provide a service suitable in respect to a specific context to a user through processing procedures such as analysis and reasoning raises a technology which can have a large influence on all fields of society such as, particular, a medical treatment, education, disaster, rescue, shopping, etc. in addition to an ubiquitous environment. The context awareness technology for a lot of application technologies is actually being developed these days and various researches for applying the technology to an actual system are performed.

In order to apply the context awareness technology to the actual system, clear definition of the context should first precede and understanding a technology structure required for the context is needed. That is, the context awareness technology can be applied to various different technology fields depending on the definition of the context and various different technologies for proper context awareness can be used.

The context awareness technology which recently obtains remarkable results is a suitable technology by defining the context as "position" and measuring interuser proximity, a distance between the user and an apparatus, etc. Further, the context awareness technology has been introduced, which provides a data service adapted to the position of the user or a range of an access network or adopted to personal preferences or requirements regardless of the position of the user or the range of the access network by appropriately selecting and providing various platforms and services based on the Internet.

A research of the known context awareness technology focuses on analyzing the user context such as a user's operation pattern on the web, etc. or providing the service adapted to the position of the user.

The known introduced technologies are not a technology of a context awareness system that provides a service adapted depending on an emotional state by analyzing the personal emotional state. That is, a utilization value and necessity of a context awareness device which can be aware of the user's emotional state and recognize/judge a risk context on the basis of the recognition of the user's emotional state so as to rapidly and accurately be aware of accidents, risks, or the like caused to the user are increased with development of a communication technology.

Furthermore, it is very important to accurately recognize the context by efficiently merging various measurement values at the time of using measurement values from various sensors which the user wears in order to analyze the user's emotional state.

SUMMARY OF THE INVENTION

In order to solve the above-mentioned problems, a first object of the present invention is to provide a context awareness method which can define a context as a user's emotional state and rapidly and accurately an accident or risk context, or the like caused to a user.

A second object of the present invention is to provide a context awareness method which efficiently recognizes a user's emotional state by utilizing recognition results of multiple sensors required for user's emotional recognition such as user's voice, motion variation, a place where the user is positioned, a user's schedule, etc.

A third object of the present invention is to allow more accurate context awareness by performing the context recognition by considering a place where a user is positioned and a user's schedule.

A fourth object of the present invention is to notify a risk context to the outside without a necessity of a dangerous activity to press an emergency bell in an emergency context such as a case in which a rubber invades a bank, a convenience store, or the like.

In order to achieve the above-mentioned object, an apparatus for context awareness includes: a voice-based recognition unit that recognizes a user's emotional state on the basis of a voice signal; a motion-based recognition unit that recognizes the user's emotional state on the basis of a motion; a position recognition unit that recognizes a location where the user is positioned; and a mergence-recognition unit that recognizes a user's context by analyzing the recognition results of the voice-based recognition unit, the motion-based recognition unit, and the position recognition unit.

The mergence-recognition unit generates a probability value corresponding to at least one recognition result of the voice-based recognition unit, the motion-based recognition unit, and the position recognition unit to recognize the user's context from the probability value.

The mergence-recognition unit recognizes the user's context by using any one algorithm of a Bayesian network, a neural network, a hidden Markov model (HMM), voting and fuzzy.

The voice-based recognition unit includes: a voice signal collection unit that collects a voice input of the user; a change timing detection unit that detects an emotional change timing of the user in time and/or frequency domains; an analysis/recognition unit that analyzes data for a predetermined time from the emotional change timing to recognize the user's emotional state based on the voice signal; and a probability value generation unit that generates a probability value relating to the accuracy of the user's emotional state recognized by the analysis/recognition unit.

The motion-based recognition unit includes: a data collection unit that collects data from one or more sensors or cameras; a data control unit that controls sensing data by the sensor or the camera; a feature extraction unit that extracts features for emotion expression gestures and activities; an analysis/recognition unit that recognizes actions representing the user's emotion on the basis of the features; and a probability value generation unit that generates a probability value relating to the accuracy of the user's emotional state recognized by the analysis/recognition unit.

The mergence-recognition unit includes: a management unit that controls the voice-based recognition unit, the motion-based recognition unit, and the position recognition unit; a schedule processing unit that provides considerations for the context awareness in the user's schedule; and a mergence-recognition/judgment unit that merges and recognizes data provided from the voice-based recognition unit, the motion-based recognition unit, the position recognition unit, and a schedule management unit to judge the user's context.

The apparatus for context awareness further includes a schedule management unit that manages and searches the user's schedule, wherein the mergence-recognition unit receives the user's schedule information from the schedule management unit and recognizes the user's context by considering the received user's schedule information.

The schedule management unit extracts items to be considered for the context awareness in the user's schedule and provides the extracted items to the mergence-recognition unit as the schedule information.

Meanwhile, in order to achieve the above-mentioned object, a method for context awareness includes: receiving a recognition result of a user's emotional state based on a voice signal; receiving a recognition result of the user's emotional state based on a motion; receiving a recognition result of a location where the user is positioned; and merging and recognizing the user's context by considering all the recognition results.

The merging and recognizing includes generating a probability value relating to the accuracy of the user's emotional state based on the voice signal.

The merging and recognizing further includes generating a probability value relating the accuracy of the recognition result of the user's emotional state based on the motion.

In the merging and recognizing, the user's context is recognized from a probability value relating to at least one recognition result of the voice-based recognition result, the motion-based recognition result, and the position recognition result.

In the merging and recognizing, the user's context is recognized by using any one algorithm of a Bayesian network, a neural network, a hidden Markov model (HMM), voting and fuzzy.

The method for context awareness further includes receiving the user's schedule information, wherein in the merging and recognizing, the user's context is recognized by considering the schedule information.

In the receiving the schedule information, only information extracted by being judged as considerations for the context awareness in the user schedule is received.

The following effects can be obtained by the present invention.

According to an embodiment of the present invention, since it is possible to define a context as a user's emotional state and rapidly and accurately recognize an accident or risk context, or the like caused to a user, it possible to contribute to improve the safety of, particularly, children, women, or old persons which are weak to the risk context.

According to the embodiment of the present invention, it is possible to efficiently recognize a user's emotional state by utilizing recognition results of multiple sensors required for user's emotional recognition such as user's voice, motion variation, a place where the user is positioned, a user's schedule, etc.

Further, according to the embodiment of the present invention, it is possible to allow more accurate context awareness by performing the context recognition by considering a place where a user is positioned and a user's schedule.

In addition, according to the embodiment of the present invention, it is possible to notify a risk context to the outside without a necessity of a dangerous activity to press an emergency bell in an emergency context such as a case in which a rubber invades a bank, a convenience store, or the like.

DETAILED DESCRIPTION OF THE PREFERRED EMBODIMENTS

Hereinafter, the present invention will be described in detail with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of elements in the figures may be exaggerated for explicit comprehension.

Hereinafter, preferred embodiments of the present invention will be described in detail with reference to the accompanying drawings.

Figure 1:
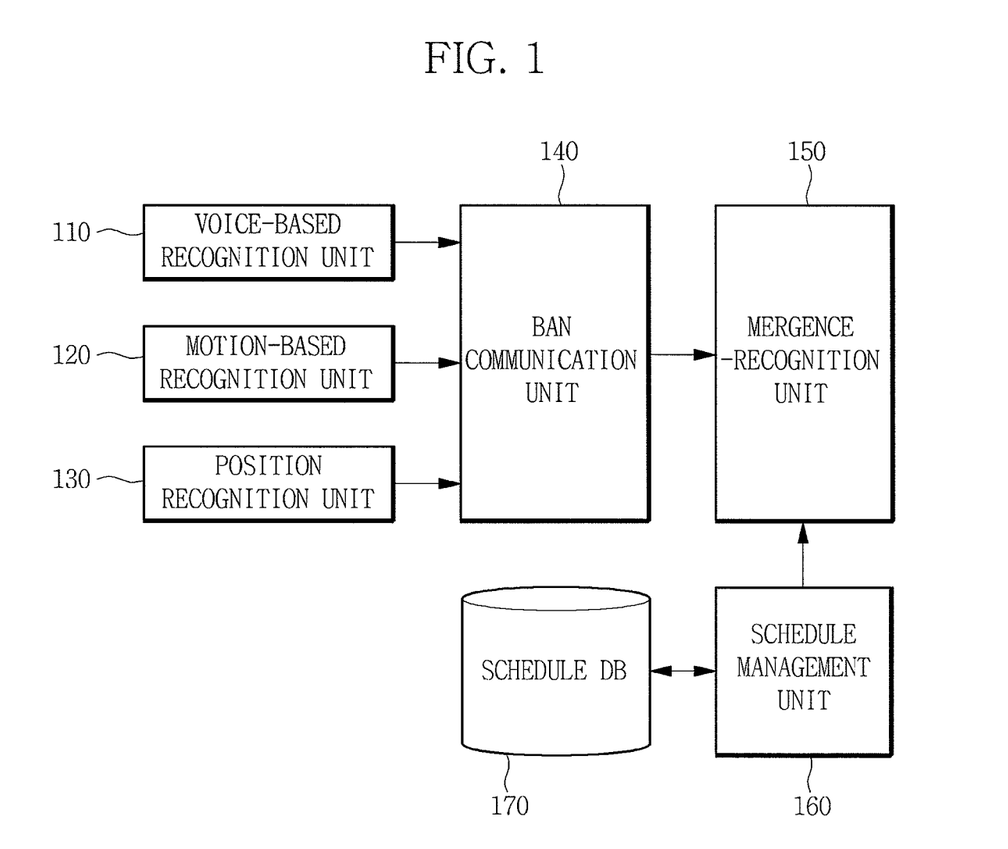
FIG. 1 is a block diagram of an apparatus of context awareness according to an embodiment of the present invention.

FIG. 1 is a block diagram of an apparatus of context awareness according to an embodiment of the present invention.

Referring to FIG. 1, the apparatus for context awareness according to the embodiment of the present invention includes a voice-based recognition unit 110, a motion-based recognition unit 120, a position-based recognition unit 130, a BAN communication unit 140, a mergence recognition unit 150, a schedule management unit 160, and a schedule database 170.

The voice-based recognition unit 110 detects timing of an emotional change from a signal inputted through a voice input device such as a mike, etc., analyzes and recognizes emotional states such as fear, pleasure, angry, etc. by analyzing user voice data for a predetermined time from the detected emotional change timing in frequency and/or time domains, and the recognition result is transmitted through a body area network (BAN), etc. At this time, the voice-based recognition unit 110 generates a probability value regarding the accuracy of a recognition result of the emotional state. The recognition result of the emotional state may contain the generated probability value.

The motion-based recognition unit 120 collects acceleration from a plurality of sensors or cameras, extracts features from the collected data and recognizes emotional expression gestures and activities such as walking, running, standing, denying, trailed, standing up, trembling, etc. by using the extracted features and a learning model, and transmits the recognition result through the BAN, etc.

At this time, the motion-based recognition unit 120 generates a probability value regarding the accuracy of a recognition result of the emotional state. The recognition result of the emotional state may contain the generated probability value.

The position recognition unit 130 measures GPS information and/or a gravity value by using a GPS and/or a gravity sensor and recognizes a location where the user is positioned by using the measurement result and a map. At this time, the location recognition result can be corrected by the gravity value measured by using the gravity sensor. Further, the location can be a concept containing floors of the building.

According to the embodiment, the position recognition unit 130 may include a GPS collection module, a gravity value measurement module, a position changing module using the map, and a location changing module using the gravity value.

Since a technology for identifying the position of the user on the map by using the GPS, etc. uses a generally known technology, a detailed description thereof will be omitted.

According to the embodiment, the position recognition unit 130 can construct a pattern database regarding the position of the user depending on a time and provide the position recognition result by various learning algorithms. At this time, the position recognition result may be a concept containing a probability value regarding the accuracy of the position recognition result. At this time, the position recognition unit 130 can generate the position recognition and the probability value by using a learning algorithm to be introduced through the voice-based recognition unit 110, etc. as below.

The reason for considering the location information in respects to the context awareness is that a meaning of a predetermined emotional state at a first location may be different from a meaning of a predetermined emotional state at a second location. For example, when an emotional state of the user who suddenly cries out while violently moving is detected, a possibility of a dangerous state is low when the user is positioned at a baseball park, but the possibility of the dangerous state is high in the case where the user is positioned in a library.

The schedule management unit 160 receives a schedule from the user and provides schedule statistics, and provides a schedule searching result for each time by a request.

The schedule management unit 160 may construct the pattern database by analyzing a user's schedule pattern.

The schedule database 170 stores user's schedule data and provides the user's schedule data to the schedule management unit 160 in accordance with a request from the schedule management unit 160.

As such, the reason for considering the schedule information in respects to the context awareness is that the meaning of the user's emotional state may be dependent on a schedule which the user is performing at present.

According to the embodiment, the schedule management unit 160 may include a schedule input module, a schedule statistics management module, a timely schedule searching module, and a predetermined pattern analysis module.

The BAN communication unit 140 exchanges data with the voice-based recognition unit 110, the motion-based recognition unit 120, and the position recognition unit 130. Although the BAN communication unit 140 is shown as a separate block in FIG. 1, the BAN communication unit 140 may be implemented as a part of another block such as the mergence recognition unit 150, etc.

The mergence recognition unit 150 merges and recognizes the information provided from the voice-based recognition unit 110, the motion-based recognition unit 120, the position recognition unit 130, and the schedule management unit 160 and recognizes the context based on the information.

When the probability value is provided from at least one the voice-based recognition unit 110, the motion-based recognition unit 120, and the position recognition unit, the mergence recognition unit 150 may perform probability-based mergence-recognition/judgment by recognizing/judging the emotional sate by using the probability value.

The mergence recognition unit 150 may construct the probability model on the basis of the information provided from the voice-based recognition unit 110, the motion-based recognition unit 120, the position recognition unit 130, and the schedule management unit 160. At this time, the mergence recognition unit 150 may recognize the context awareness in accordance with the information provided from the voice-based recognition unit 110, the motion-based recognition unit 120, the position recognition unit 130, and the schedule management unit 160 on the basis of the probability module.

Figure 2:
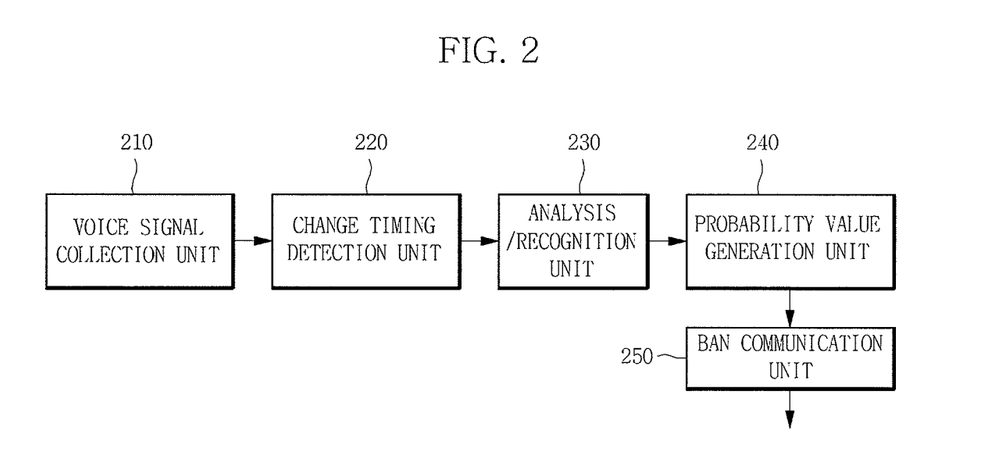
FIG. 2 is a block diagram showing an example of a voice-based recognition unit shown in FIG. 1.

FIG. 2 is a block diagram showing an example of a voice-based recognition unit 110 shown in FIG. 1.

Referring to FIG. 2, the voice-based recognition unit shown in FIG. 1 includes a voice signal collection unit 210, a change timing detection unit 220, an analysis/recognition unit 230, a probability value generation unit 240, and a BAN communication unit 250.

The voice signal collection unit 210 collects user's voice input through the mike, etc. At this time, the voice signal collection unit 210 may convert the user's voice input into an electric signal, and sample and analog-to-digital convert the converted signal. Furthermore, the voice signal collection unit 210 may quantize the digital-converted signal.

Further, the voice signal collection unit 210 can enhance an S/N ratio by using high-frequency and low-frequency improvement modules.

The change timing detection unit 220 detects the timing when the emotional state is changed by using Teager energy, pitch, smoothness, or the like in the time/frequency domain.

For example, the timing when the emotional state is changed may be the timing when the pitch or smoothness is abruptly changed in a phrase unit.

A method of detecting a voice band may be performed by various methods such as methods disclosed in J. C. Junqua, B. Mark, and B. Reaves, 'A Robust Algorithm for Word Boundary Detection in the Presence of Noise', IEEE transaction Speech and Audio Processing, Vol. 2, No. 3, 1994.

The analysis/recognition unit 230 recognizes the emotional state by analyzing the change of the Teager energy, pitch, or smoothness of data in the frequency domain and/or the time domain for a predetermined time from the timing of the emotional change.

For example, when the abrupt change of the smoothness is continued for a predetermined time, the analysis/recognition unit 230 may map the measurement result to uneasy emotional states such as surprise, etc.

At this time, the analysis/recognition unit 230 may include a database regarding voice pattern corresponding to user's various emotional states and recognize the emotional state by using various pattern matching techniques. In regards to the pattern matching technique, various methods including R. Duda and P. Hart, 'Pattern Classification and Scene Analysis', John Wiley & Sons, 1973, etc. are introduced.

Various voice recognition technologies using the change of the Teager energy, pitch, or smoothness are introduced through theses, but implementation methods for implementing functions of the change timing detection unit 220 and the analysis recognition unit 230 are not limited to predetermined methods.

The probability value generation unit 240 converts the accuracy of the user's emotional state recognized by the analysis/recognition unit 230 into a probability result.

For example, the probability value generation unit 240 may output an output probability in a hidden Markov model (HMM) as the probability value. The HMM and the output probability are, in detail, disclosed in the Korean Unexamined Patent No. 1999-0037460, etc.

The BAN communication unit 250 wirelessly transmits the recognized emotional state and/or the corresponding probability value through the network such as the BAN, etc.

Figure 3:
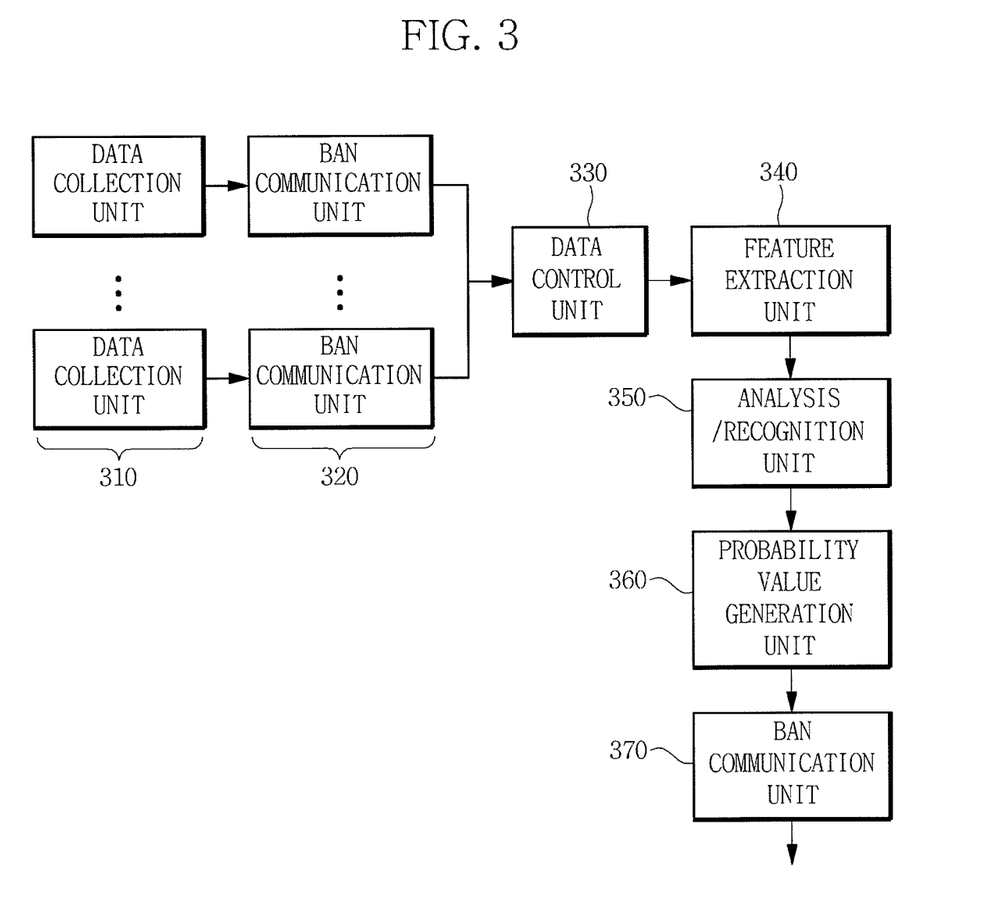
FIG. 3 is a block diagram showing an example of a motion-based recognition unit shown in FIG. 1.

FIG. 3 is a block diagram showing an example of a motion-based recognition unit 120 shown in FIG. 1.

Referring to FIG. 3, the motion-based recognition unit 120 shown in FIG. 1 includes a data collection unit 310, a BAN communication unit 320, a data control unit 330, a feature extraction unit 340, an analysis/recognition unit 350, a probability value generation unit 360, and a BAN communication unit 370.

One or more data collection units 310 may be provided to correspond to the number of sensors or cameras and collect data from the sensor or the camera.

The BAN communication unit 320 wirelessly transmits the data collected by the data collection unit 310 through the network such as the BAN, etc.

The data control unit 330 checks the condition of the sensor or camera through the BAN communication unit 320 and synchronizes the data from the sensor or camera provided through the data collection unit 310.

The feature extraction unit 340 extracts features for recognizing the emotional expression gestures and activities from the data provided from the sensor or camera.

At this time, the feature extraction unit 340 may use the difference between acceleration values or a trace of the acceleration value as the feature.

The analysis/recognition unit 350 recognizes action activities such as walking, running, standing, sitting, etc. and gestures expressing personal emotions such as denying, hanging-up, struggling, draggling, hurting, etc. by using a threshold-based rule-based method or a learning algorithm such as a neural network, the HMM, support vector machine (SVM), etc.

The probability value generation unit 360 generates a probability value representing the accuracy of the recognized emotional state.

The BAN communication unit 370 wirelessly transmits the recognized emotional state and/or the corresponding probability value through the network such as the BAN, etc.

The analysis/recognition unit 350, the probability value generation unit 360, and the BAN communication unit 370 of the motion-based recognition unit described through FIG. 3 operate in a similar manner as the analysis/recognition unit 230, the probability value generation unit 240, and the BAN communication unit 250 shown in FIG. 2 in addition to recognizing the motion on the basis of the data collected from the sensor or camera.

A technology of recognizing the operation through the sensor which is not specifically described through FIG. 3 is, in detail, disclosed in the Korean Unexamined Patent No. 2007-0031658, etc.

Figure 4:
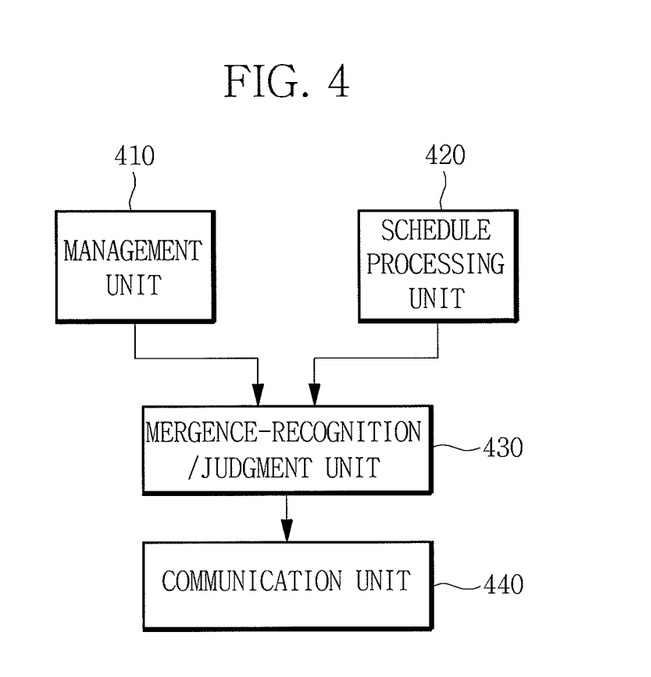
FIG. 4 is a block diagram showing an example of a mergence-recognition unit shown in FIG. 1.

FIG. 4 is a block diagram showing an example of a mergence-recognition unit 150 shown in FIG. 1.

Referring to FIG. 4, the mergence-recognition unit 150 shown in FIG. 1 includes a management unit 410, a schedule processing unit 420, a mergence-recognition/judgment unit 430, and a communication unit 440.

The management unit 410 controls the voice-based recognition unit 110, the motion-based recognition unit 120, and the position recognition unit 130 shown in FIG. 1 to receive an output value from each block and performs error control and synchronization of each block.

The schedule processing unit 420 extracts considerations for the context awareness in a user schedule and provides the extracted considerations to the mergence-recognition/judgment unit 430.

For example, the schedule processing unit 420 can provide schedule information relating to a primary location in a day schedule.

For example, the user schedule is classified by a unique code and the schedule processing unit 420 can extract a schedule corresponding to a previously set predetermined code.

The mergence-recognition/judgment unit 430 merges and recognizes the data provided from the voice-based recognition unit 110, the motion-based recognition unit 120, the position recognition unit 130, and the schedule management unit 160 to judge a dangerous context.

At this time, the mergence and recognition can be performed by any one algorithm of a Bayesian network, a neural network, the hidden Markov model (HMM), voting and fuzzy, and the support vector machine (SVM).

Further, the mergence/recognition/judgment unit 430 may generate a mergence module in order to efficiently merge two or more information of the voice-based recognition result, the motion-based recognition result, the location recognition result, and the schedule information. For this, various learning algorithms may be used such as the Bayesian network, neural network, hidden Markov model (HMM), voting or fuzzy, and the like which have previously been used.

A detailed content regarding mergence recognition and generation of the mergence module, which is not described herein is specifically disclosed in the Korean Unexamined Patent No. 2008-0050994, etc.

According to the embodiment, the mergence-recognition/judgment unit 430 may merge/recognize/judge the user's dangerous context by using a probability value provided through at least one of the voice-based recognition result, the motion-based recognition result, and the location recognition result.

In particular, the mergence-recognition/judgment unit 430 may more accurately recognize a user's state by using information provided from the position recognition unit 130 and the schedule management unit 160 at the time of generating the mergence module.

The communication unit 440 transmits the recognition result of the mergence-recognition/judgment unit 430 through the network. At this time, the network may be a wireless network such as a wireless LAN (WLAN) or the BAN.

Although the case in which the blocks communicate with each other through the wireless network has been described as an example in the above description, the network described in the embodiment of the present invention may be a wired network.

Figure 5:
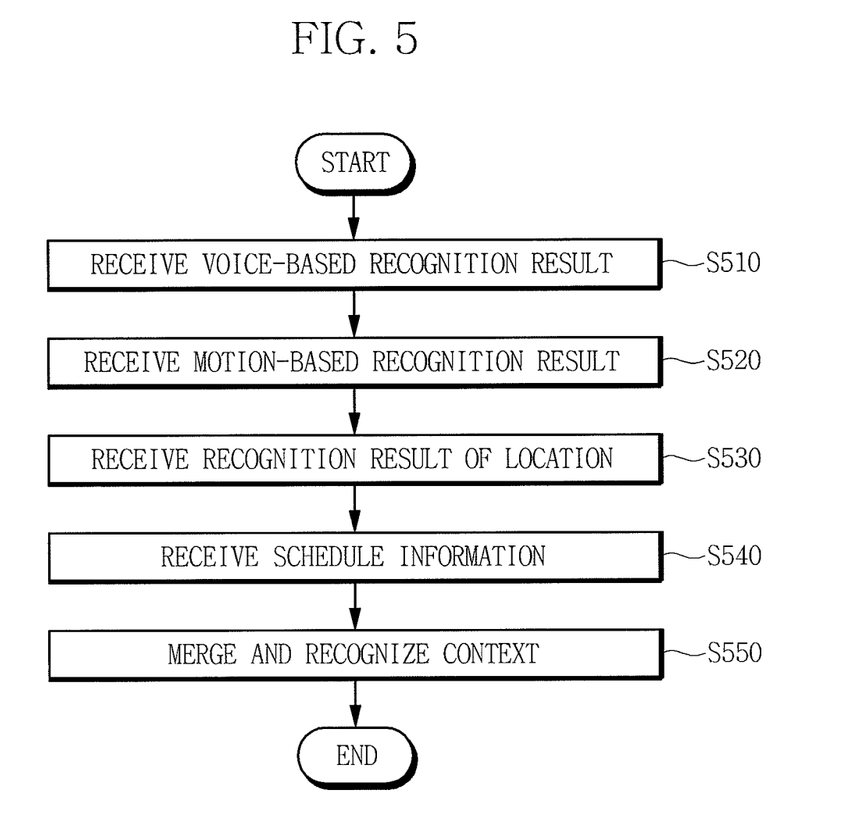
FIG. 5 is an operational flowchart showing a method for context awareness according to an embodiment of the present invention.

FIG. 5 is an operational flowchart showing a method of a method for context awareness according to an embodiment of the present invention. Referring to FIG. 5, in the method for context awareness, a recognition result of a user's emotional state based on a voice signal is received (S510). At this time, the recognition result of the emotional state may include the probability value.

Further, in the method for context awareness according to the embodiment of the present invention, a recognition result of the user's emotional state based on a motion is received (S520). At this time, the recognition result of the emotional state may include the probability value.

Further, in the method for context awareness according to the embodiment of the present invention, a recognition result of a location where the user is positioned is received (S530). At this time, the recognition result of the location may include the probability value.

Further, in the method for context awareness according to the embodiment of the present invention, the user's schedule information is received (S540). At this time, at step 'S540', only information extracted by being judged as considerations for context awareness in the user schedule can be received.

Further, in the method for context awareness according to the embodiment of the present invention, the user context is merged and recognized by considering both the recognition results and the schedule information (S550).

At this time, at step 'S550', the user's context can be recognized by analyzing the probability value included in at least one of the recognition result of the user's emotional state based on the voice signal, the recognition result of the user's emotional state based on the motion, and the recognition result of the location. At this time, at 'S550', the user's context can be recognized by using any one algorithm of the Bayesian network, the neural network, the hidden Markov model (HMM), the voting, and the fuzzy.

The steps shown in FIG. 5 may be performed in an order shown in FIG. 5, a reverse order thereof, or at the same time.

As described above, the optimal embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An apparatus for context awareness, comprising:
a voice-based recognition unit that recognizes a user's emotional state on the basis of a voice signal;
a motion-based recognition unit that recognizes the user's emotional state on the basis of a motion;
a position recognition unit that recognizes a location where the user is positioned; and
a mergence-recognition unit that recognizes a user's context by analyzing the recognition results of the voice-based recognition unit, the motion-based recognition unit, and the position recognition unit.

2. The apparatus for context awareness according to claim 1, wherein the mergence-recognition unit generates a probability value corresponding to at least one recognition result of the voice-based recognition unit, the motion-based recognition unit, and the position recognition unit to recognize the user's context from the probability value.

3. The apparatus for context awareness according to claim 1, wherein the voice-based recognition unit includes:
a voice signal collection unit that collects a voice input of the user;
a change timing detection unit that detects an emotional change timing of the user in time and/or frequency domains;
an analysis/recognition unit that analyzes data for a predetermined time from the emotional change timing to recognize the user's emotional state based on the voice signal; and
a probability value generation unit that generates a probability value relating to the accuracy of the user's emotional state recognized by the analysis/recognition unit.

4. The apparatus for context awareness according to claim 1, wherein the motion-based recognition unit includes:
a data collection unit that collects data from one or more sensors or cameras;
a data control unit that controls sensing data by the sensor or the camera;
a feature extraction unit that extracts features for emotion expression gestures and activities;
an analysis/recognition unit that recognizes actions representing the user's emotion on the basis of the features; and
a probability value generation unit that generates a probability value relating to the accuracy of the user's emotional state recognized by the analysis/recognition unit.

5. The apparatus for context awareness according to claim 1, wherein the mergence-recognition unit includes:
a management unit that controls the voice-based recognition unit, the motion-based recognition unit, and the position recognition unit;
a schedule processing unit that provides considerations for the context awareness in the user's schedule; and
a mergence-recognition/judgment unit that merges and recognizes data provided from the voice-based recognition unit, the motion-based recognition unit, the position recognition unit, and a schedule management unit to judge the user's context.

6. The apparatus for context awareness according to claim 1, further comprising:
a schedule management unit that manages and searches the user's schedule,
wherein the mergence-recognition unit receives the user's schedule information from the schedule management unit and recognizes the user's context by considering the received user's schedule information.

7. The apparatus for context awareness according to claim 6, wherein the schedule management unit extracts items to be considered for the context awareness in the user's schedule and provides the extracted items to the mergence-recognition unit as the schedule information.

8. A method for context awareness, comprising:
receiving a recognition result of a user's emotional state based on a voice signal received by a first sensor;
receiving a recognition result of the user's emotional state based on a motion received by a second sensor;
receiving a recognition result of a location where the user is positioned received by a third sensor; and
merging by a merging unit and recognizing by a recognizing unit the user's context by considering all the recognition results.

9. The method for context awareness according to claim 8, wherein the merging and recognizing includes generating a probability value relating to the accuracy of the user's emotional state based on the voice signal.

10. The method for context awareness according to claim 8, wherein the merging and recognizing further includes generating a probability value relating the accuracy of the recognition result of the user's emotional state based on the motion.

11. The method for context awareness according to claim 8, wherein in the merging and recognizing, the user's context is recognized from a probability value relating to at least one recognition result of the voice-based recognition result, the motion-based recognition result, and the position recognition result.

12. The method for context awareness according to claim 8, further comprising:
   receiving the user's schedule information,
   wherein in the merging and recognizing, the user's context is recognized by considering the schedule information.

13. The method for context awareness according to claim 12, wherein in the receiving the schedule information, only information extracted by being judged as considerations for the context awareness in the user schedule is received.

* * * * *